April 25, 1933.  C. W. LEGUILLON  1,905,917
SEPARABLE FASTENER
Filed July 9, 1932
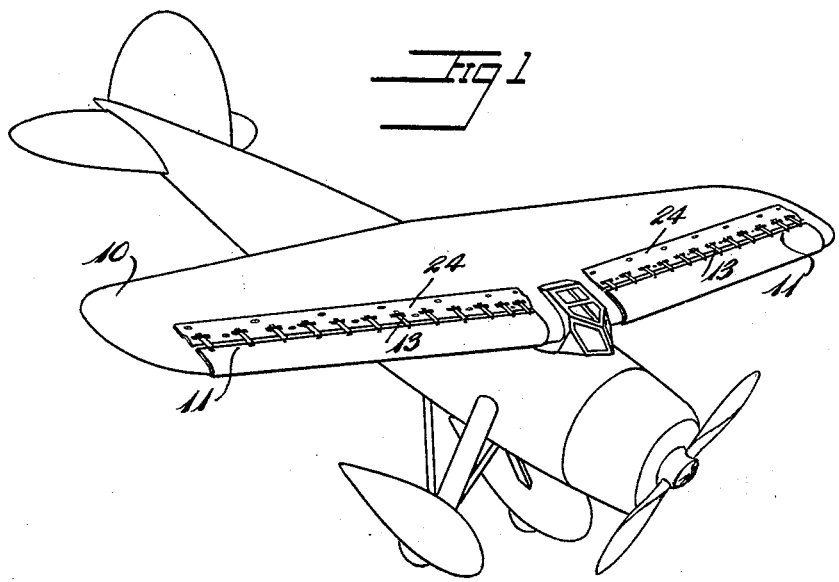
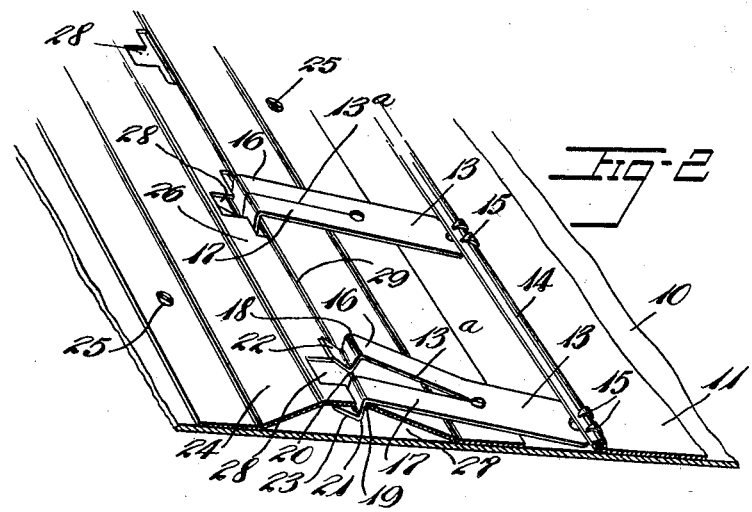
Inventor
Charles W. Leguillon
By Eskine & Avery
Attys Patented Apr. 25, 1933

1,905,917

UNITED STATES PATENT OFFICE

CHARLES W. LEGUILLON, OF AKRON, OHIO, ASSIGNOR TO THE B. F. GOODRICH COMPANY, OF NEW YORK, N. Y., A CORPORATION OF NEW YORK

SEPARABLE FASTENER

Application filed July 9, 1932. Serial No. 621,664.

This invention relates to separable fasteners and especially to that class of fasteners in which a swinging strap member attached to one of the parts to be fastened interlockingly engages a catch plate secured to the other member.

The principal objects of the invention are to provide security, simplicity, and neatness in construction, to provide ease of operation, and to provide a structure having low wind resistance so as to adapt it to use on aircraft.

Other objects will appear from the following description and the accompanying drawing.

In the drawing:

Fig. 1 is a perspective view of an airplane having its wings equipped with deicers or other coverings on their leading margins which are fastened in place by use of the fasteners of this invention.

Fig. 2 is a perspective view of the fasteners, showing one of the fasteners fully engaged and another partly engaged, parts being broken away.

Referring to the drawing, the numeral 10 designates the wing of an airplane or other object to which it is desired to attach the margin 11 of a deicer or other layer of sheet material. The strap or latch member 13 of the fastener is made of spring metal and is attached at one end to the margin of the sheet material so as to be capable of lateral deflection both in the plane of the sheet material and perpendicular thereto. This is conveniently accomplished by providing a beaded margin 14 on the fabric and one or more prongs 15 on the end of the strap capable of being forced through the sheet material and clinched around the beaded margin thereof.

The free end of the strap is split longitudinally as at 13ª to provide a pair of latch members 16 and 17 of equal width. Each of the members 16 and 17 is bent sharply downward as at 18 and 19 to provide latch shoulders in line with each other, and therebeyond is reversely bent as at 20 and 21 to provide tongues 22 and 23.

The other part of the fastener comprises a catch plate 24 having its margins fastened by screws 25 or otherwise to the wing 10 of the plane or other stationary member. The plate 24 has a central zone 26 raised from the supporting surface to provide a clearance space 27 thereunder. A T-shaped opening 28 is formed through the zone 26 with the stem of the T pointing away from the strap 13. The stem of the T-shaped opening is made slightly wider than one of the tongues 22, 23, and the cross of the T-shaped opening is made slightly longer than the combined width of the latch members 16 and 17 and preferably equal to one and one half times their combined width. In order to provide an additional wearing surface where the T-shaped opening is engaged by the latch shoulders, the plate 24 may be given a reverse bend laterally thereof and adjacent the edge defining the top of the T-shaped opening as at 29. This also adds to the rigidity of the catch plate.

Where it is desired to fasten a margin of a sheet having a great extent, the catch plate 24 may be made as a continuous strip of metal provided at intervals with T-shaped openings and the strap members or latches may be spaced along the margin of the sheet accordingly as shown in the drawing.

In operating the fastener one of the tongues 22 or 23 is aligned with the stem of the T-shaped opening 28 by laterally swinging the latch and depressing it through the slot with its latch shoulder engaging the shoulder 29. The latch is then shifted laterally to a position where the other tongue is over the stem of the T-shaped opening and it is similarly depressed. The latch 13 is then shifted to its normal position where both tongues 22 and 23 are engaged under the latch plate 24.

When the latch members are all engaged the fastener presents very little resistance to the air stream as the straps 13 lie in conforming relation to the continuous catch plate. The catch plate may have the sides of its raised zone only slightly inclined and therefore presents only a slight deviation from the surface to which it is applied. As the straps and catch plate may be made of thin sheet metal, the device is light in weight and adds very little to the weight of the plane to which it is attached. As the anchorage of the strap members tends to keep them centered in the T-shaped slots due to their semi-rigid attachment to the sheet material 11, the straps are securely retained in place against vibration. When the device is used on an airplane or other device subject to a current of air along its surface, the pressure of the air stream tends to hold the straps in latched position.

Should the latch member become laterally displaced, due to vibration, far enough to allow one of the bifurcations to align with the stem of the T-slot, such member will spring up sufficiently to lock the latch against lateral movement, preventing escape of the other member.

I claim:

1. A separable fastener comprising a catch plate adapted to be attached to one of the members to be fastened and formed with a T-shaped opening, and a bifurcated spring latch adapted to be flexibly attached to the other member to be fastened, said bifurcations being such size and shape relative to the T-shaped opening as to interlock with the catch plate only by successive entrance of said bifurcations through said opening.

2. A separable fastener comprising a catch plate adapted to be attached to one member to be fastened and having a raised zone pierced by a T-shaped opening, a spring latch adapted to be attached to a margin of the other member and split to provide a pair of bifurcations of such size and shape relative to said T-shaped opening as to enter said opening in succession and to be collectively irremovable therefrom.

3. A separable fastener comprising a catch plate adapted to be attached to one member to be fastened and formed with a T-shaped opening, a spring latch adapted to be attached to the other member and formed of a strip of flat material longitudinally split to provide a pair of bifurcations, said bifurcations being of such size and shape relative to said opening as to enter said opening only in succession by flexing one of the bifurcations from its normal position and to be collectively irremovable therefrom.

4. A separable fastener comprising a catch plate adapted to be attached to one member to be fastened and formed with an opening comprising a stem and a lateral enlargement at on end thereof, a spring latch adapted to be attached to the other member and split to provide a pair of bifurcations, said bifurcations being of such size and shape relative to said opening as to enter said opening only in succession and to be collectively irremovable therefrom.

5. A separable fastener comprising a catch plate adapted to be attached to one member to be fastened and formed with an opening wider at the end toward the other member to be fastened than at the end remote from the other member, and a spring latch adapted to be attached to the other member and split to provide a pair of latch members, said latch members being of such size and shape relative to said opening as to enter said opening only in succession and to be collectively irremovable therefrom.

6. A separable fastener comprising a latch strip adapted to be attached to one member to be fastened and comprising a single strip of flat spring material split to provide parallel latch members united at their bases, and a catch plate adapted to be attached to the other member and formed with a latch engaging opening, said opening and said latch members being relatively of such shape and size as to permit passage of the latch members through said opening in succession but not collectively.

In witness whereof I have hereunto set my hand this 24th day of June, 1932.

CHARLES W. LEGUILLON.